June 29, 1937.  H. E. HOLLMANN  2,085,022
METHOD OF TUNING RECEIVERS OPERATING ON POTENTIAL RESONANCE
Filed April 15, 1935
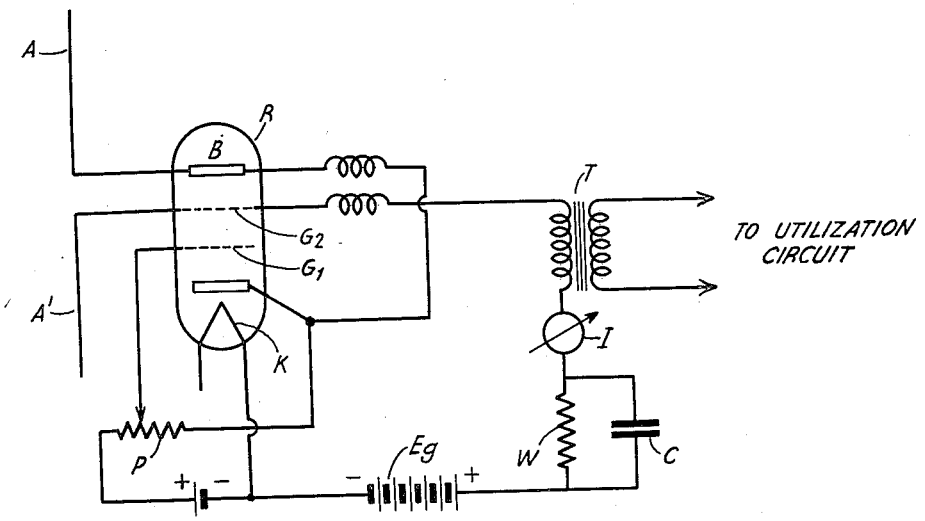
INVENTOR
HANS ERIC HOLLMANN
BY
ATTORNEY Patented June 29, 1937

2,085,022

UNITED STATES PATENT OFFICE 2,085,022

METHOD OF TUNING RECEIVERS OPERATING ON POTENTIAL RESONANCE

Hans Erich Hollmann, Berlin, Germany, assignor to Telefunken Gesellschaft für Drahtlose Telegraphie m. b. H., Berlin, Germany, a corporation of Germany Application April 15, 1935, Serial No. 16,305
In Germany April 23, 1934

8 Claims. (Cl. 250—27)

It is known that methods used for the generation of ultra-short waves, such as the retarding field method and the magnetron method, are also satisfactorily used for receiving purposes, this particular use, in fact, involving the advantage that the apparatus can be tuned by simple variation of the acceleration voltage for the electrons to the wave that is to be received. If the transit times of the electrons agree with the period of the incoming oscillations, de-attenuation occurs, and the receiver apparatus will then have its maximum sensitivity. The manipulation of such a receiver set may be greatly facilitated and simplified by calibrating the acceleration voltage of the indicating instrument so as to read directly in terms of wave length.

Apart from the electrode potentials, the electron transit times depend upon the strength of the emission current so that a calibration of the acceleration potential in wave lengths may be regarded as holding good with adequate accuracy, also for a definite strength of current to which the receiver set must be regulated prior to the voltage determination proper. In calibrating the receiver, the regulation of the emission current is effected by positive acting means. According to the invention, voltage tuning is effected by first regulating only the emission current and using this current in the output circuit to flow across an ohmic resistance to produce a fall of potential whereby the battery voltage is diminished. By choosing suitable dimensions for the load resistance and the battery voltage, conditions may be so adjusted that the receiver will operate nearly at maximum sensitiveness within a large range of operation. In this manner, the entire adjustment and manipulation is confined to the regulation of the emission current. In lieu of the plate volt-meter, there is then used a measuring instrument for the emission current which is to be calibrated directly to read in terms of wave length.

In the case of indirectly heated tubes, regulation of the current given off from the cathode by variation of the heating current is impractical because of the great thermal inertia of such cathodes, for which reason the regulation in the present invention is effected more suitably by way of a distinct regulator grid to which a variable biasing voltage is imparted. Furthermore, the load resistance permitting the voltage "tuning" (adjustment) could serve at the same time for the coupling of an amplifier stage with the rectifier, while the same should suitably be bridged or shunted by a large capacity whenever a distinct coupling means such as a transformer is provided.

A retarding field type rectifier, predicated upon the principle hereinbefore outlined comprising only one regulating device, is illustrated in the drawing. R denotes the retarding field tube to which, as known in the art, the two antenna halves A and A' (dipole) are connected. The retarder electrode B is directly united with the cathode, though it would also be feasible to impress upon it a suitable biasing potential either from a distinct source or tapped from a high ohm resistance. The modulation changes occurring in the circuit of the positively biased grid G2 are fed to a higher amplifier by way of output transformer T. In addition thereto, the grid circuit includes also the resistance W which, so far as the modulation currents are concerned, is shunted by the capacity C. Regulation of the emission current is insured by adjustment of the voltage of the space charge grid G1, upon which a variable biasing potential is impressed by way of the voltage divider P. The grid current $i_g$ thus produces across W a fall of voltage $i_{g_2} \times W$, which may be regulated by the aid of the said voltage divider P, so that the grid voltage turns out to be equal to $E_g - (i_{g_2} \times W)$. It will be understood that the calibration of the milliammeter I in terms of wave length presupposes a perfectly constant battery voltage $E_g$, though the latter can be readily stabilized by the aid of glow discharge stabilizers.

In a similar manner the basic idea of the invention can be applied to any desired kind of voltage adjusted receiver such as a push-pull type of retarding field audion. Among other merits, this scheme offers the special advantage that the tuning of a distinct radio frequency circuit is also dispensed with so that the whole manipulation of the receiver, as a matter of fact, is confined to a regulation of the emission current by the aid of a single knob.

What is claimed is:

1. In combination, an electron discharge device having an anode, a cathode and a grid, a dipole antenna having two arms, one arm being coupled to said anode and the other arm to said grid, and means for maintaining said grid at a high positive potential and said anode at a less potential relative to said cathode, said means including a source of potential whose negative terminal is connected to said cathode and whose positive terminal is connected to said grid, a resistance located between said positive terminal and said grid for absorbing part of said grid voltage, a measuring instrument in circuit with said resistance, means for varying the proportion of grid voltage absorbed by said resistance, and translating apparatus coupled to said grid circuit.

2. In combination, an electron discharge device having an anode, a cathode and a grid, a dipole antenna having two arms, one arm being coupled to said anode and the other arm to said grid, and means for maintaining said grid at a high positive potential and said anode at a less potential relative to said cathode, said means including a source of potential whose negative terminal is connected to said cathode and whose positive terminal is connected to said grid, a resistance located between said positive terminal and said grid for absorbing part of said grid voltage, and means including another grid located between said first grid and cathode and having an adjustable bias potential applied thereto for varying the proportion of grid voltage absorbed by said resistance.

3. In an ultra high frequency receiving system, an electron discharge device having an anode, a cathode and a grid, a dipole antenna having two arms, one arm being coupled to said anode and the other arm to said grid, and means for maintaining said grid at a high positive potential and said anode at a less potential relative to said cathode, said means including a source of potential whose negative terminal is connected to said cathode and whose positive terminal is connected to said grid, a series circuit of a transformer winding, a meter calibrated in wave lengths, and a resistance located between said grid and positive terminal, a condenser in parallel to said resistance, and a utilization circuit inductively coupled to said transformer winding.

4. A system in accordance with claim 3, characterized in this that said electron discharge device comprises an indirectly heated tube, including an auxiliary grid located between said first grid and said cathode, a potentiometer between said cathode and said source of potential and a connection from said auxiliary grid to a point intermediate the ends of said potentiometer.

5. In combination, an electron discharge device having an anode, a cathode and a grid, a dipole antenna having two arms, one arm being coupled to said anode and the other arm to said grid, and means for maintaining said grid at a high positive potential and said anode at a less potential relative to said cathode, said means including a source of potential whose negative terminal is connected to said cathode and whose positive terminal is connected to said grid, a resistance located between said positive terminal and said grid for absorbing part of said grid voltage, a measuring instrument calibrated in wave lengths in circuit with said resistance, a condenser in shunt with said resistance, and translating apparatus coupled to said grid circuit.

6. In combination, an electron discharge device having an anode, a cathode and a grid, a dipole antenna having two arms, one arm being coupled to said anode and the other arm to said grid, and means for maintaining said grid at a high positive potential and said anode at a less potential relative to said cathode, said means including a source of potential whose negative terminal is connected to said cathode and whose positive terminal is connected to said grid, a resistance located between said positive terminal and said grid for absorbing part of said grid voltage, a condenser in parallel with said resistance, and means including an additional electrode in said device for varying the proportion of grid voltage absorbed by said resistance.

7. In combination, an electron discharge device having an anode, a cathode and a grid, means for maintaining said grid at a high positive potential and said anode at a less potential relative to said cathode, said means including a source of potential having a negative terminal connected to said cathode and a positive terminal connected to said grid, a resistive load located between said positive terminal and said grid for absorbing part of the grid voltage, and an auxiliary electrode located between said cathode and first grid and having an adjustable bias potential applied thereto for varying the proportion of grid voltage absorbed by said load.

8. In combination, an electron discharge device having an anode, a cathode and a grid, an input circuit having one terminal connected to said anode and its other terminal connected to said grid, means for maintaining said grid at a high positive potential and said anode at a less potential relative to said cathode, said means including a source of potential having a negative terminal connected to said cathode and a positive terminal connected to said grid, a resistive load located between said positive terminal and said grid for absorbing part of the grid voltage, and an auxiliary electrode located between said cathode and first grid and having an adjustable bias potential applied thereto for varying the proportion of grid voltage absorbed by said load.

HANS ERICH HOLLMANN.